Oct. 10, 1950  J. L. RUSSELL ET AL  2,524,837
DEVICE FOR THE ELIMINATION OF RANDOM
SIGNALS FROM A RECURRENT WAVE SOURCE
Filed Dec. 16, 1943
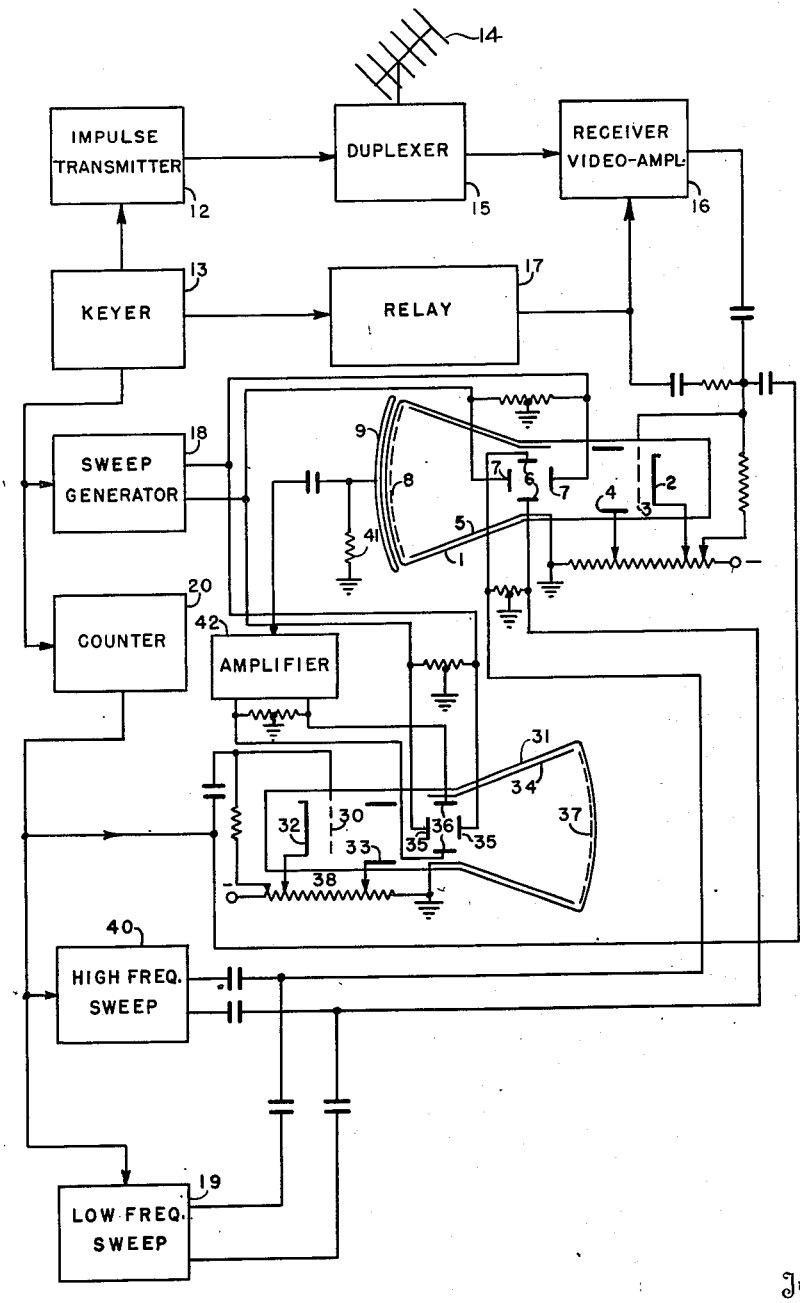
Inventors
JAMES L. RUSSELL
ELVIN E. HERMAN
By
Attorney Patented Oct. 10, 1950

2,524,837

UNITED STATES PATENT OFFICE 2,524,837

DEVICE FOR THE ELIMINATION OF RANDOM SIGNALS FROM A RECURRENT WAVE SOURCE

James L. Russell and Elvin E. Herman, Washington, D. C.

Application December 16, 1943, Serial No. 514,487

5 Claims. (Cl. 343—5)

(Granted under the act of March 3, 1883, as amended April 30, 1928; 370 O. G. 757)

This invention relates to the integration of variable signals and is particularly directed to the problem of determining the instantaneous average values throughout the complete cycle of a recurrent signal which is carrying extraneous variations. Such variations may arise from thermal or other noise source, or natural and man made static interference where the signal undergoes radio transmission. The invention is also applicable to a signal varying in amplitude.

Accordingly it is the object of the invention to obtain the average value of a recurrent signal over a plurality of cycles.

The invention provides for the storage of successive signal cycles as potential variations along the length of separate sweep paths on a charge pattern sustaining target. Such operation may be effected by sweeping an electron beam modulated in accordance with the signal across the target. A wide variety of sweep generating systems may be employed for establishing a suitable sweep pattern. Thus, a series of concentric circles, a spiral, or a parallel line television type sweep are satisfactory. After the desired number of signal cycles are recorded, the charge pattern is taken off the target by sweeping orthogonally across the storage sweep lines to ascertain the average potential thereof at the storage signal phase position of the orthogonal sweep, and progressively advancing the orthogonal sweep along the length of the storage sweeps to generate an output signal incorporating the successive average values of the accumulated signal cycles. The target output circuit may be fed from a conductive plate backing the target or from attendant current variations in the second anode or collector circuit. Subsequent to the wiping operation another storage cycle is begun.

It will be understood that the number of signal cycles to be accumulated is limited only by the size of the target and the width of the storing trace and that any limitation present in systems where superimposed storage sweeps may result in potential saturation of the target is avoided.

In the specific embodiment of the invention to be described the integrating system is incorporated in an echo ranging device which supplies a recurrent signal which may carry noise, static, and interference components. As such components appear in random phase, and the echo signal in the same or slowly varying phase, the averaging process results in a very significant decrease in the relative value of the undesired components. In such a system the signal recurrence frequency is under coordinate control with the storage sweep generator system to provide the proper synchronism. In other applications the conventional sweep synchronizing circuits will be used to key the sweeps under control of the input signal.

The invention will be further disclosed with reference to the exemplary embodiment shown in circuit diagram in the drawing.

Such system includes cathode ray storage tube 1 provided with a conventional electron gun having elements 2, 3, 4, and 5 and electrostatic deflection plates 6 and 7. Target 8 may be an iconoscope type mosaic, but more conveniently is the conventional fluorescent coating of a viewing tube. Signal plate 9 is a conductive coating or metal plate applied exteriorly to the tube envelope opposite the target. This tube is described and claimed in our copending application Serial No. 514,485, filed December 16, 1943.

The input signal is derived from the radar system including an impulse transmitter 12 firing periodically under control of keyer 13 and feeding antenna 14 through duplexing system 15. The receiver and video amplifier system 16 supplies a recurrent signal to grid 3 of storage tube 1 to modulate the electron beam.

The receiver system is normally inoperative and is rendered operative by relay 17 responsive to keyer 13. Relay 17 also unblanks the grid 3 of storage tube 1.

The storage sweep pattern is established by sweep generators 18 and 19. Sweep 18 is keyed directly at the transmission repetition rate to accord with the signal recurrence frequency so that storing sweeps are inaugurated at the same phase angle of the signal. Plates 7 of tube 1 are fed by 18.

Sweep generator 19 is operated at a division frequency of the transmission repetition rate, the ratio being the number of signal cycles over which integration is desired. For this purpose counter 20 is operated by keyer 13 and is used to synchronize sweep 19 which feeds plates 6 of tube 1. Consequently, as both pair of deflection plates are supplied with saw-tooth wave forms, vertical plates 6 from the low frequency saw-tooth generator 19 and horizontal plates 7 from the high frequency saw-tooth sweep generator 18, a series of parallel horizontal storage sweeps are generated on target 8 in the same manner as a conventional television kinescope raster is generated.

The integrated output signal is generated in this system by operation of counter 20 which supplies a control impulse having a duration equal to the signal recurrence period. In addition to synchronizing the low frequency sweep, this impulse is applied to grid 30 of indicator tube 31. This tube is similar to tube 1 and includes gun elements 30, 32, 33, and 34, and deflection plates 35 and 36. The tube carries no signal plate, however, and the integrated signal is viewed on fluorescent screen 37. The tube is normally biased below visibility on divider 38, and is periodically rendered operative by the output of counter 20.

Deflection plates 35 of tube 31 are constantly fed from generator 18 to sweep the same in synchronism with the storage sweeps on tube 1, and thereby on the take-off sweep of the storage tube, as will now appear.

Counter 20 also supplies a positive bias to control grid 3 of tube 1 to hold the beam substantially constant at a high saturation level overriding the receiver output, and simultaneously keys high frequency sine wave oscillator 40 to override the low frequency sweep 19. As noted hereinabove, the control pulse from counter 20 is equal in duration to the signal recurrence period. In response to this pulse, sweep 40 is rendered operative to establish a rapid oscillatory trace across the potential distribution of all the storage sweeps, and this orthogonal trace is progressively moved along the length of the storage sweeps by generator 18. The output signal generated across signal plate load resistor 41 is supplied through amplifier 42 to vertical deflection plates 36 of tube 31, while the beam is swept in synchronism with the scan of tube 1 by sweep generator 18. Consequently the averaged signal is indicated in deflection from the time base line of tube 31, and, as above explained, will appear with much lower interference content than the original signals supplied by receiver 16.

The invention described herein may be manufactured and used by or for the Government of the United States of America for governmental purposes without the payment of any royalties thereon or therefor.

We claim:

1. Means for averaging a plurality of cycles of a recurrent signal including a charge pattern sustaining target, means for sweeping said target in spaced paths with an electron beam at the signal recurrence frequency, means for modulating said beam with said recurrent signal to establish said signal cycles on said sweep paths as potential variations, and means for sweeping an electron beam across said paths at a high frequency and simultaneously along the direction of said paths for taking off the target potential distribution as an output signal having said average value.

2. In an echo ranging system, a periodically operative impulse transmitter, a receiver, a charge pattern sustaining target, means for sweeping an electron beam across said target in one direction at the impulse recurrence frequency to establish a time base, means for shifting said beam orthogonally of said time base sweep direction to generate spaced sweep paths across said target, means for modulating the electron beam current with the receiver output signals to establish potential variations on said target along said spaced sweep paths, and means intermittently operative to sweep the beam orthogonally of said time base sweep direction at a high frequency to take off the potential variations of said spaced sweeps substantially simultaneously and generate an output signal having the average value of the receiver output signals.

3. In a device for the elimination of random signals from a recurrent wave source, a cathode-ray tube having a control grid and a screen, a cathode-ray tube having a control grid connected in parallel with the control grid of said first named tube and having a charge pattern sustaining target, a bias control circuit connected to the control grid of said first and second named cathode ray tubes for alternately raising and lowering the bias thereon, and means including a signal plate backing for said charge pattern sustaining target for coupling the output from said charge pattern sustaining target of said second named tube to a beam controlling electrode of the first named tube.

4. Means for averaging a plurality of cycles of a recurrent signal including a charge pattern sustaining target, means including a first sweep circuit for sweeping an electron beam across said target in one direction at the signal recurrence frequency and in a second direction orthogonally of said first direction to generate spaced sweep paths on said target, means for modulating said beam with said recurrent signal to establish said signal cycles on said sweep paths as potential variations, means including a second sweep circuit for sweeping an electron beam across said paths at a high frequency relative to said signal recurrence frequency and simultaneously along the direction of said paths for taking off the target potential distribution as an output signal having an average value of recurrent signal, and means connected to said first and second sweep circuits for rendering the same operative in sequential alternation.

5. In an echo ranging system, a periodically operative impulse transmitter, a receiver, a charge pattern sustaining target, means including a first sweep circuit for sweeping an electron beam across said target in one direction at the impulse recurrence frequency to establish a time base sweep, and simultaneously in a second direction orthogonally of said time sweep to generate spaced sweep paths across said target, means for modulating the electron beam current with the receiver output signals to establish potential variations on said target along said spaced sweep paths, a second sweep circuit to sweep the beam orthogonally of said time base sweep direction at a high frequency to take off the potential variations of said spaced sweeps substantially simultaneously and generate an output signal having the average value of the receiver output signals, and means connected to said first and second sweep circuits to render the same operative in sequential alternation.

JAMES L. RUSSELL.
ELVIN E. HERMAN.

REFERENCES CITED

The following references are of record in the file of this patent:

UNITED STATES PATENTS

| Number | Name | Date |
|---|---|---|
| 2,175,573 | Schroter | Oct. 10, 1939 |
| 2,219,021 | Riesz | Oct. 22, 1940 |
| 2,293,899 | Hanson | Aug. 25, 1942 |
| 2,407,000 | Evans | Sept. 3, 1946 |
| 2,410,233 | Percival | Oct. 29, 1946 |
| 2,422,135 | Sanders | June 10, 1947 |
| 2,430,038 | Wertz | Nov. 4, 1947 |
| 2,437,173 | Rutherford | Mar. 2, 1948 |